US007899028B2

(12) United States Patent  
Semper

(10) Patent No.: US 7,899,028 B2  
(45) Date of Patent: Mar. 1, 2011

(54) METHOD AND SYSTEM FOR SYNCHRONIZING DATA TRANSMISSIONS IN IP-BASED NETWORKS

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 957 days.

(21) Appl. No.: 11/682,738

(22) Filed: Mar. 6, 2007

(65) Prior Publication Data

US 2008/0101333 A1 May 1, 2008

Related U.S. Application Data

(60) Provisional application No. 60/854,939, filed on Oct. 27, 2006.

(51) Int. Cl.
*H04W 4/00* (2009.01)
*H04J 3/24* (2006.01)
*H04J 3/06* (2006.01)
*H04H 20/71* (2008.01)
*H04B 7/00* (2006.01)

(52) U.S. Cl. .................. 370/350; 370/328; 370/349; 370/312; 455/524; 455/525

(58) Field of Classification Search .............. 370/310, 370/312–313, 324, 328–329, 338, 341, 348–350, 370/360, 395.52, 395.62, 500, 507–514, 370/520, 343–345, 430, 468, 471, 472, 503, 370/901–902, 912–913, 915; 375/145, 149, 375/240.28, 299, 357, 358, 363–366; 455/422.1, 455/423–425, 434, 439, 445, 450–451, 466, 455/509, 511, 514–515, 524–525, 550.1, 455/560–561, 452.1–452.2, 500, 502–503, 455/517, 556.2

See application file for complete search history.

(56) References Cited

U.S. PATENT DOCUMENTS

| | | | | |
|---|---|---|---|---|
| 6,512,784 B2 * | 1/2003 | Schilling | ...................... | 375/141 |
| 6,574,211 B2 * | 6/2003 | Padovani et al. | ............ | 370/347 |
| 6,977,903 B1 * | 12/2005 | Ohtani et al. | ................ | 370/252 |
| 7,058,035 B2 * | 6/2006 | English | ...................... | 370/332 |
| 7,430,193 B2 * | 9/2008 | Kim et al. | .................... | 370/318 |
| 2001/0055972 A1 * | 12/2001 | Sakata | ......................... | 455/452 |
| 2002/0027889 A1 * | 3/2002 | Yun et al. | .................... | 370/331 |
| 2002/0114404 A1 * | 8/2002 | Aizawa et al. | ............... | 375/295 |
| 2003/0039232 A1 * | 2/2003 | Casati et al. | ................ | 370/337 |
| 2003/0161386 A1 * | 8/2003 | Schilling | ...................... | 375/141 |
| 2004/0246917 A1 * | 12/2004 | Cheng et al. | ................ | 370/328 |
| 2005/0068917 A1 * | 3/2005 | Sayeedi | ...................... | 370/328 |

(Continued)

FOREIGN PATENT DOCUMENTS

EP    1 128 704 A1 *  8/2001

*Primary Examiner*—Meless N Zewdu

(57) ABSTRACT

A method and system for synchronizing data transmissions in a wireless communications network are disclosed. As one example, a method for synchronizing data transmissions in a wireless communications network is disclosed. The method includes the steps of receiving forward link data at a central access unit in the wireless communications network, forwarding the forward link data from the central access unit to a plurality of transceivers in the wireless communications network, temporarily storing the forward link data at each transceiver of the plurality of transceivers, and forwarding the temporarily stored forward link data from a first transceiver of the plurality of transceivers to a mobile station.

20 Claims, 4 Drawing Sheets

U.S. PATENT DOCUMENTS

2005/0118946 A1* 6/2005 Colban et al. .............. 455/3.06
2005/0220071 A1* 10/2005 Sivalingham et al. ....... 370/349
2007/0049324 A1* 3/2007 Sambhwani et al. ........ 455/525
2008/0008129 A1* 1/2008 Nagarajan et al. ........... 370/331

* cited by examiner

| (MSB) | | BIT POSITION | | | | | (LSB) | OCTET NUMBER |
|---|---|---|---|---|---|---|---|---|
| 0 | 1 | 2 | 3 | 4 | 5 | 6 | 7 | |
| PROTOCOL ID = 01H (CALL PROCESSING) | | | | | | | | 1 |
| MESSAGE ID = 02H (ACTIVE SET ADDITION RESPONSE) | | | | | | | | 2 |
| SYNCHRONIZATION CODE = [01H-FFH] | | | | | | | | 3 |
| ELEMENT ID = 03H (RESPONSE CODE) | | | | | | | | 4 |
| CODE = [01H (SECTOR ADDED) - 02H (SECTOR ADDITION REJECTED)] | | | | | | | | 5 |

| | BIT POSITION | | | | | | | OCTET NUMBER |
|---|---|---|---|---|---|---|---|---|
| (MSB) | | | | | | | (LSB) | |
| 0 | 1 | 2 | 3 | 4 | 5 | 6 | 7 | |
| PROTOCOL ID=01H (CALL PROCESSING) | | | | | | | | 1 |
| MESSAGE ID=01H (ACTIVE SET ADDITION REQUEST) | | | | | | | | 2 |
| SYNCHRONIZATION CODE = [01H – FFH] | | | | | | | | 3 |
| ELEMENT ID = 01H (TIME STAMP) | | | | | | | | 4 |
| TIME STAMP VALUE = [00 00 00 00H–FF FF FF FFH] | | | | | | | | 5 |
| | | | | | | | | 6 |
| | | | | | | | | 7 |
| | | | | | | | | 8 |
| ELEMENT ID = 02H (CALL KEY) | | | | | | | | 9 |
| KEY VALUE = [00 00 00 00H–FF FF FF FFH] | | | | | | | | 10 |
| | | | | | | | | 11 |
| | | | | | | | | 12 |
| | | | | | | | | 13 |

FIG. 6A

METHOD AND SYSTEM FOR SYNCHRONIZING DATA TRANSMISSIONS IN IP-BASED NETWORKS

CROSS-REFERENCE TO RELATED APPLICATION AND CLAIM FOR PRIORITY

The present application is related to U.S. Provisional Patent Application No. 60/854,939, entitled "TRANSCEIVER FUNCTION SYNCHRONIZATION FOR CENTRALIZED ARCHITECTURE IN IP-RAN," filed on Oct. 27, 2006, which is assigned to the assignee of the present application. The subject matter disclosed in U.S. Provisional Patent Application No. 60/854,939 is incorporated by reference into the present application as if fully set forth herein. The present application hereby claims priority, under 35 U.S.C. §119(e), to U.S. Provisional Patent Application No. 60/854,939.

FIELD OF THE INVENTION

The invention relates to the telecommunications field, and more particularly, but not exclusively, to a method and system for synchronizing data transmissions in Internet Protocol-(IP)-based networks.

BACKGROUND OF THE INVENTION

The architectures for today's Wireless Radio Access Networks (WRANs) are evolving towards a flatter, distributed structure, which will rely upon IP-based packet switching and Internet Engineering Task Force (IETF) protocols for data transport. In this regard, as voice services are moved from the traditional circuit-switched dedicated bearer model to an IP-based packet-switched model, Voice over IP (VoIP) will become a dominant application. However, notwithstanding the numerous advantages that may be realized with IP-based RANs, there are significant VoIP-related implementation issues that need to be resolved. For example, there are several unresolved issues related to the delivery of VoIP packets from a RAN to the Mobile Stations (MSs) involved. One of the most important of these issues involves determining how an IP-based RAN can support fast cell selection performed by MSs.

In future evolutions of the radio air interface protocols for IP-based RANs, the MSs will be capable of deciding which Base Transceiver Station (BTS) to receive data transmissions from. In that regard, FIG. 1 is a block diagram depicting the current centralized network architecture that has evolved. Referring to FIG. 1, the evolved centralized architecture 100 includes a core IP network 102 and an IP-based RAN 106 connected for IP-based communications via a gateway 104. The IP-based RAN 106 includes a Base Station Controller (BSC) 108 connected to the gateway 104 and a plurality of Base Transceiver Stations (BTSs) 110, 112 and 114. Each BTS 110, 112, 114 is connected to a plurality of MSs (e.g., as indicated by the connection between BTS 112 and MS 116).

In operation, the incoming and outgoing VoIP calls are anchored at a central BSC (e.g., BSC 108). Also, the BSC executes a Robust Header Compression (ROHC) IP-header compression scheme, and houses the Radio Link Protocol (RLP) instance for the MS involved. The BSC is responsible for making all of the resource allocations for the VoIP call, and the radio air interface's layer 3 signaling terminates in the BSC. The BSC is also responsible for maintaining the Active Set (i.e., adding or deleting sectors) for the MS involved, based on measurements of the strengths of the pilot signals transmitted by the MS.

FIG. 2 is a block diagram depicting an existing technique 200 used for fast cell selection in an IP-RAN. Referring to FIG. 2, as an MS (e.g., MS 116) engages in a VoIP call, MIP packets (including encoded voice packets) destined for the MS, arrive at the BSC (not shown). Before the BSC forwards the information to the MS, the BSC compresses the MIP header (and, possibly, other headers included within, such as UDP and RTP headers). In the radio air interface that has evolved, it will be possible for the MS to receive these packets from any BTS that supervises sectors in the MS's Active Set.

Referring to the existing fast cell selection technique 200 depicted in FIG. 2, the dashed line 202 shows that Forward Link (FL) data is sent to the MS (116) from one sector (BTS 114) in the MS's Active Set at a time. As shown by line 204, the MS indicates the BTS (BTS 112) from which the MS wants to receive data, by targeting the MS's Reverse Channel Quality Indicator Channel (R-CQICH) to the sector from which the MS wants to receive data, and setting the Desired Forward Link Serving Sector (DFLSS) bit to "1". As shown by line 206, if the BTS (112) that controls that sector accepts the request, it returns a Forward Link Access Message (FLAM) to the MS, and the MS then begins to receive data on this new sector.

It is important to note that the signaling to be used for fast cell selection occurs at the Physical (PHY) and Medium Access Control (MAC) layers of the air interface. For increased speed and efficiency, it would be advantageous if the MS involved were able to indicate to the RAN which sector to use for the FL, without having to send layer 3 messages that must be processed at the BSC. For one thing, the PHY and MAC layers have all of the information needed to make the decisions involved, and sending layer 3 messages would require additional processing to send this information to the higher level layer for message creation purposes. Also, the signaling could be performed quicker and more efficiently if it were accomplished at the lower level PHY and MAC layers.

Essentially, the main implementation problem that needs to be resolved for fast cell selection in IP-based RANs is to determine how to synchronize the data transmissions at the various BTSs being controlled by a BSC, so that an MS can receive data from any BTS by using PHY and MAC level signaling. The existing synchronization approaches call for RAN signaling between the BSC and the BTSs, in order to activate bearer paths between the BSC and a new BTS after the new BTS receives the DFLSS data from the MS involved. This problem is illustrated by the existing fast cell selection RAN signaling technique shown in FIG. 3.

Referring to the existing fast cell selection RAN signaling technique 300 depicted in FIG. 3, lines 302a and 302b show that FL data is being sent to the MS (116) from one sector (BTS 114) in the MS's Active Set at a time. Line 304 shows that the MS (116) is indicating (with signaling) a new preferred FL serving sector (BTS 112). Line 306 shows that the new BTS (BTS 112) is requesting (with signaling) the BSC (BSC 108) to switch bearers, and line 308 shows that the BSC is acknowledging this request (with signaling). Line 310 shows that (with signaling) the BSC is informing the prior BTS (BTS 114) that the FL data transmissions are being terminated, and lines 312, 314 show that FL data is now flowing to the MS through the new BTS (BTS 112).

Unfortunately, the existing fast cell selection RAN signaling technique depicted in FIG. 3 will negatively impact delay-sensitive applications, such as VoIP. Consequently, an approach is needed for synchronizing the data transmissions of all BTSs in an Active Set, so that the FL transmissions can begin immediately after an MS selects a new serving sector, and also ensures that the transmitted packets will arrive in the proper order at the MS.

SUMMARY OF THE INVENTION

In a first example embodiment, a method for synchronizing data transmissions in a wireless communications network is provided. The method includes the steps of receiving forward link data at a central access unit in the wireless communications network, forwarding the forward link data from the central access unit to a plurality of transceivers in the wireless communications network, temporarily storing the forward link data at each transceiver of the plurality of transceivers, and forwarding the temporarily stored forward link data from a first transceiver of the plurality of transceivers to a mobile station.

In a second example embodiment, a method for synchronizing data transmissions in an Internet Protocol-based radio access network is provided. The method includes the steps of transmitting data on a forward link to a base station controller, the base station controller transmitting the data on a forward link to a plurality of base transceiver stations, buffering the data at each base transceiver station of the plurality of base transceiver stations, and a first base transceiver station of the plurality of base transceiver stations transmitting the data on a forward link to a mobile station.

In a third example embodiment, a system for synchronizing data transmissions in a wireless communications network is provided. The system includes a mobile station, a plurality of transceivers, and a central access unit configured to transmit the forward link data to the plurality of transceivers, wherein a first transceiver of the plurality of transceivers is configured to transmit the forward link data to the mobile station.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram depicting an example method and system for synchronizing data transmissions in an IP-based network, which can be used to implement a second example embodiment of the present invention; and FIGS. 6A-6B are related diagrams depicting example messaging formats, which may be used for synchronizing data transmissions in an IP-based network, in accordance with one or more example embodiments of the present invention.

DETAILED DESCRIPTION OF PREFERRED EMBODIMENT

Figure 1:
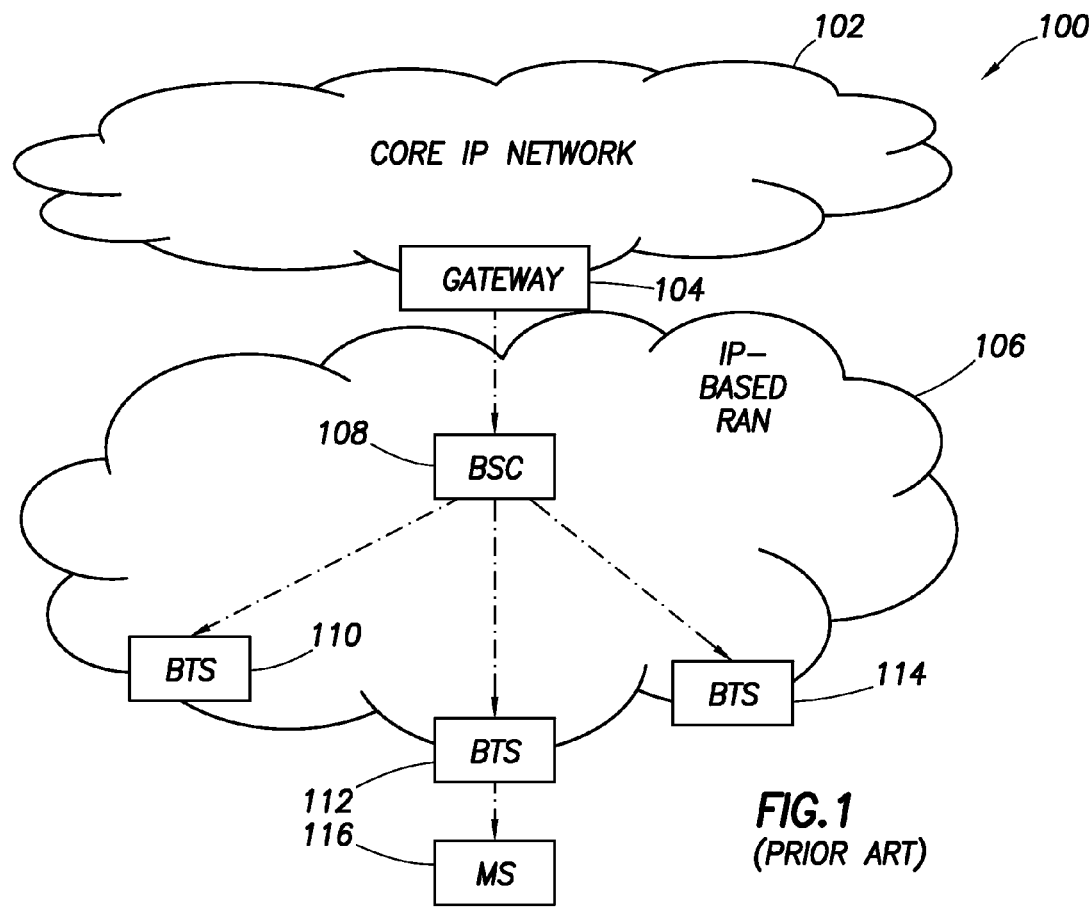
FIG. 1 is a block diagram depicting the current centralized network architecture that has evolved.
Figure 2:
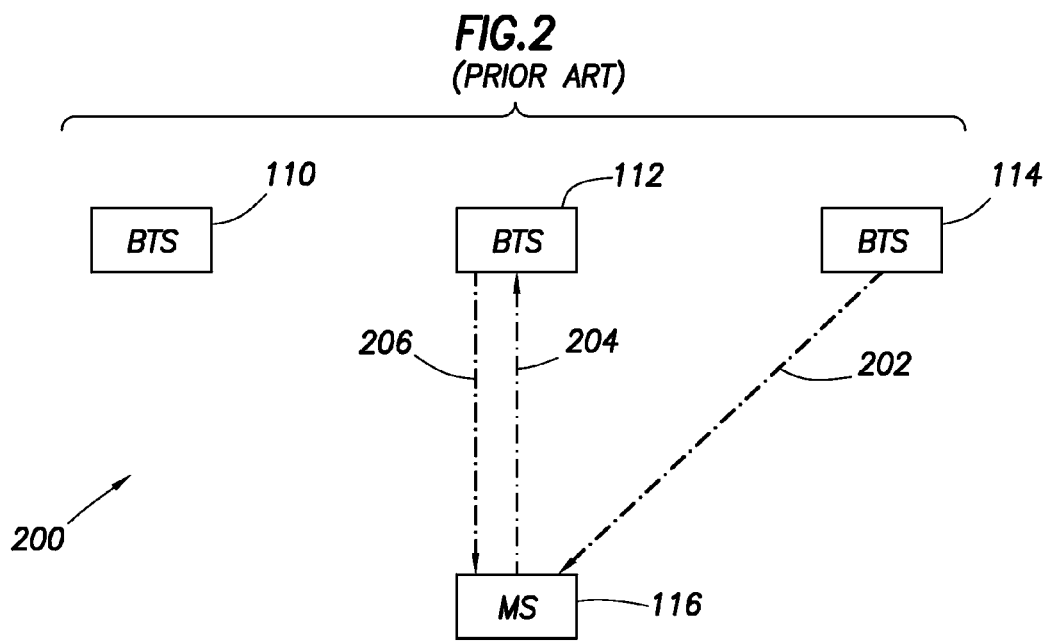
FIG. 2 is a block diagram depicting an existing technique used for fast cell selection in an IP-RAN.
Figure 3:
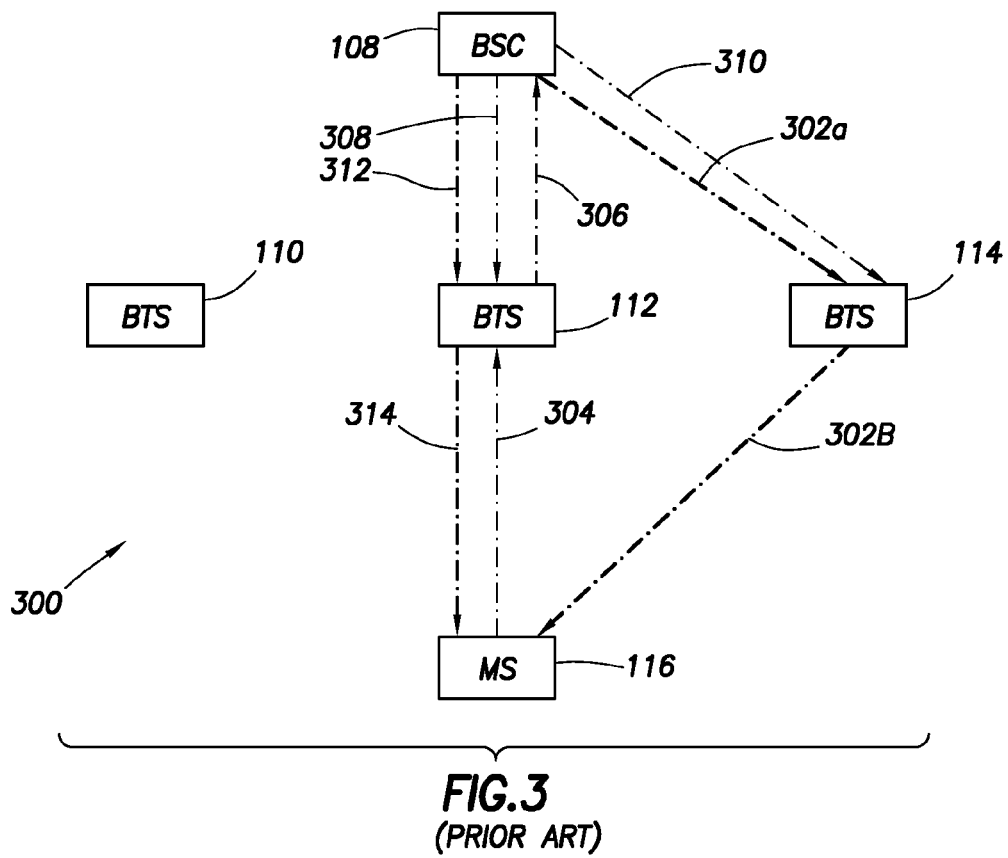
FIG. 3 is a block diagram depicting an existing fast cell selection RAN signaling technique.
Figure 4:
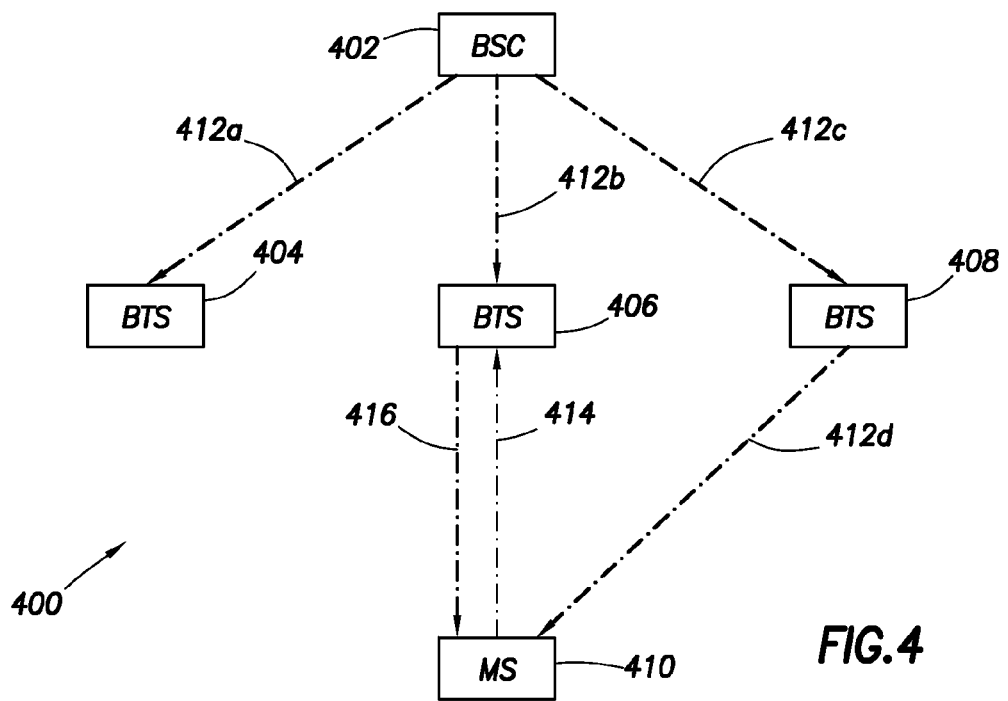
FIG. 4 is a block diagram depicting an example method and system for synchronizing data transmissions in an IP-based network, which can be used to implement a first example embodiment of the present invention.

With reference again to the figures, FIG. 4 is a block diagram depicting an example method and system for synchronizing data transmissions in an IP-based network, which can be used to implement a first example embodiment of the present invention. For illustrative purposes, in this example embodiment, the method and system shown may be used for data transmissions and/or fast cell selection in an IP-RAN. Referring to FIG. 4, an example IP-based RAN 400 is shown, which includes a BSC 402 connected to a plurality of BTSs 404, 406 and 408, and an MS 410. Also, for illustrative purposes, it may be assumed that, initially, FL data is being sent to MS 410 from the sector controlled by BTS 408. Note that the exemplary configuration shown for IP-based RAN 400 in FIG. 4 is disclosed for illustrative purposes, and is not intended to impose any limitations on the scope of coverage of the present invention. For example, it should be understood that IP-based RAN 400 may include more or less network components than the number of network components shown, and any suitable IP network may be used instead of the exemplary IP-based RAN shown.

For this example embodiment, assume that the BSC 402 maintains the Active Set, RLP instance, and ROHC header compressor for a VoIP call in which MS 410 is currently engaged. Notably, in a completely distributed architecture, there may be no BSC. Thus, in a different embodiment of the present invention, a BTS may be selected as an anchor BTS to perform the relevant functions of the BSC. In this case, the anchor BTS may assume the same functionality as the BSC, and distribute packets to the other BTSs in the Active Set. In yet a different embodiment, the BSC (or anchor BTS) may distribute packets to a subset of the BTSs in the Active Set (i.e., not all of the BTSs in the Active Set), or to other BTSs not included in the Active Set.

Also, for this example embodiment, it may be assumed that there are numerous serving sectors in the Active Set, and each sector is controlled by a different BTS. Note that, in a different embodiment, one or more of the BTSs may be operating under the control of a BSC other than BSC 402. In any event, the FL VoIP packets may arrive at BSC 402 from a core network (not shown), and BSC 402 compresses the headers before the packets are forwarded to any BTS.

Essentially, for this example embodiment, if a new BTS is to be added to the Active Set during the VoIP call, the BSC sends a signaling message over the communication links of the IP-based RAN to that BTS. The message invites the new sector to join the call, and includes a timestamp that identifies when the message was sent, and a call key to identify the call. If the new BTS is operating under the control of a different BSC, then the originating BSC can send this message to the other BSC, which can forward the message to the new BTS. If the new BTS is capable of supporting the requested invitation, the new BTS replies with an acceptance message. If the new BTS is operating under the control of a different BSC, the acceptance message can be forwarded to the originating BSC via the other BSC. The originating BSC then adds the new sector to the Active Set for the VoIP call.

For this example embodiment, when VoIP packets arrive at the BSC 402 (e.g., from a core network), BSC 402 compresses the headers in the VoIP packets, encapsulates each packet in a Generic Routing Encapsulation (GRE) packet, and forwards a copy of the GRE packet to each BTS that controls a sector in the Active Set. Alternatively, the BSC may forward the full VoIP packets encapsulated in GRE packets to the BTS, and the BTS may perform the header compression. For example, the GRE packets may be conveyed from the BSC to each BTS using the network protocol of the IP-RAN involved (e.g., IPv4 protocol). Note that the dashed lines 412a, 412b and 412c show that BSC 402 is forwarding copies of a GRE packet to each BTS 404, 406, 408 in the Active Set. Line 412d shows that, initially, BTS 408 is controlling the FL serving sector for MS 410 during the VoIP call. In other words, as shown, the FL data is being sent to all of the sectors in the Active Set. The FL data may be stored temporarily at each BTS (e.g., in a buffer storage area), but forwarded to the MS from only one sector at a time.

The line 414 shows that the MS 410 is sending a signaling message (via the IP-based RAN) to a new BTS 406, in which MS 410 is indicating its preference for BTS 406 to be the new FL serving sector. Line 414 shows that the new BTS 406 has begun sending FL data to MS 410, while the other BTSs 404, 408 are buffering the incoming FL data being received. For this example embodiment, the header of each GRE packet includes a Call Key field, which can be used to identify the VoIP call. Also, the header of each GRE packet includes a Sequence Number field, which includes a number inserted by the encapsulator (e.g., processor) at the BSC. If fast cell selection is not being performed, this sequence number may be used by the BTS that receives the GRE packet to establish the order in which the GRE packets have been transmitted from the BSC to that BTS.

For this example embodiment, if fast cell selection is being performed, the value of the Sequence Number in the header of the GRE packet can be used to identify an offset time with respect to the timestamp value sent in the original signaling request message. The value in the offset time field indicates a time period during which the BTS involved should send the GRE packet to the MS, if the MS requests the data while using fast cell selection during that timeframe. The durations of the time periods represented by the offset time values are configurable parameters. Each BTS in the Active Set receives a copy of the GRE packet, but only the BTS that controls the serving sector forwards the packet to the MS (e.g., during the time period defined by the offset time value). Each BTS in the Active Set can buffer the received GRE packets for a predetermined period of time, and discard the packets if they are not forwarded to the MS The pertinent parameters, such as the offset time interval, buffer time period, and any jitter time adjustments required, can be pre-programmed on a per-deployment basis.

In a different embodiment, the Call Key field in the header of the GRE packet can be partitioned to indicate both the VoIP call identifier and the time offset. In yet another embodiment, the Sequence Number field in the header of the GRE packet can be partitioned to indicate both the VoIP call identifier and the time offset.

Figures 5, 6B:
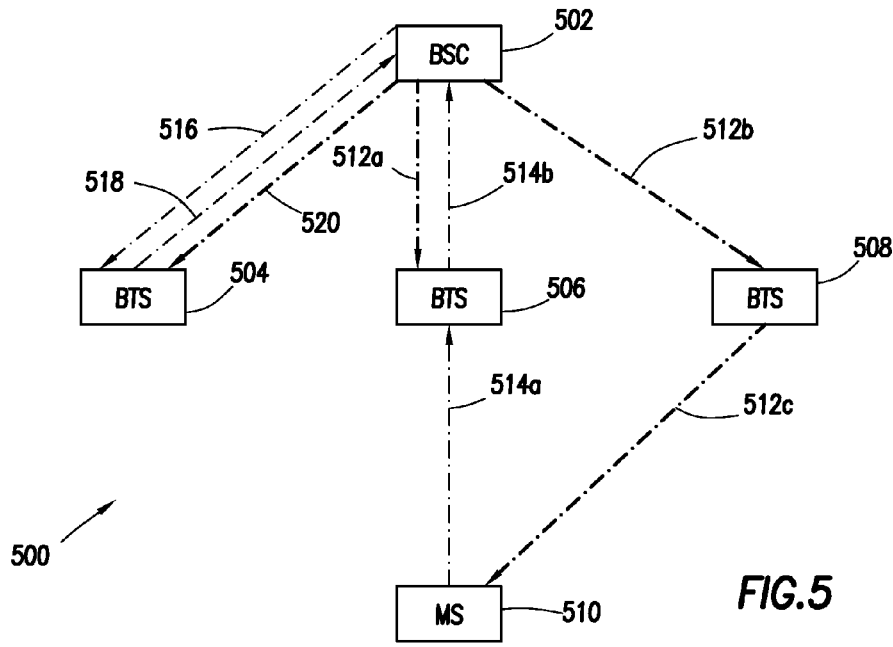

FIG. 5 is a block diagram depicting an example method and system for synchronizing data transmissions in an IP-based network, which can be used to implement a second example embodiment of the present invention. For illustrative purposes, in this example embodiment, the method and system shown may be used to add one or more serving sectors to an Active Set in an IP-RAN. Referring to FIG. 5, an example IP-based RAN 500 is shown, which includes a BSC 502 connected to a plurality of BTSs 504, 506 and 508, and an MS 510. Also, for illustrative purposes, it may be assumed that, initially, FL data is being sent to MS 510 from the sector controlled by BTS 508. Note that the exemplary configuration shown for IP-based RAN 500 in FIG. 5 is disclosed for illustrative purposes, and is not intended to impose any limitations on the scope of coverage of the present invention. For example, it should be understood that IP-based RAN 500 may include more or less network components than the number of network components shown.

For this example embodiment, when VoIP packets arrive at the BSC 502 (e.g., from a core network), BSC 502 compresses the headers in the VoIP packets, encapsulates each packet in a GRE packet, and forwards a copy of the GRE packet to each BTS that controls a sector in the Active Set. Alternatively, the BSC may forward the full VoIP packets encapsulated in GRE packets to the BTS, and the BTS may perform the header compression. In this case, the dashed lines 512a and 512b show that BSC 502 is forwarding copies of a GRE packet to each BTS 506 and 508, which are currently controlling respective sectors in the Active Set. Line 512c indicates that, initially, BTS 508 is controlling the FL serving sector for MS 510 during the VoIP call. The FL data may be stored temporarily at each BTS 506, 508 in the Active Set (e.g., in a respective buffer), but forwarded to the MS from only one sector at a time (currently from the sector controlled by BTS 508).

The line 514a shows that MS 510 is providing (with signaling) to BTS 506 a new pilot signal measurement value for BTS 504, and line 514b shows that BTS 506 is forwarding (with signaling) the new pilot signal measurement value to BSC 502. Line 516 shows that BSC 502 is sending a request message (with signaling) to BTS 504 that requests BTS 504 to add a new sector to the Active Set for MS 510. Line 518 shows that BTS 504 is sending an acknowledgement message to BSC 502 that confirms whether or not BTS 504 has added a new sector to the Active Set. If desired as a design option, BSC 502 may forward this information (with signaling) to MS 510 via BTS 506 or BTS 508. Line 520 shows FL data (including the GRE packets) now being forwarded from BSC 502 to BTS 504, which is controlling the new sector in the Active Set.

FIGS. 6A-6B are related diagrams depicting example messaging formats 600a-600b, which may be used for synchronizing data transmissions in an IP-based network, in accordance with one or more example embodiments of the present invention. For example, the example message formats shown in FIGS. 6A-6B may be used for fast cell selection and/or serving sector addition in an IP-based network (e.g., IP-RAN). Also, for example, the message formats shown in FIGS. 6A-6B may be used for signaling messages being conveyed in the example embodiments depicted in FIGS. 4 and 5.

In one example embodiment, messaging formats 600a-600b represent an IP-based messaging protocol, which may be used for synchronizing FL data transmissions in an IP-based network using lower level PHY and MAC layer signaling between the MSs, BTSs and/or BSCs involved (e.g., as opposed to layer 3 signaling). For example, messaging formats 600a-600b may be used, respectively, as an active set addition request, active set addition response, channel use update, and channel use update acknowledgment message format for network signaling in an IP-based network using PHY and MAC layer signaling.

Referring to FIG. 6A, as disclosed above with respect to FIG. 5, if a new BTS is to be added to the Active Set (e.g., during a VoIP call), the BSC sends a request message to the new BTS, which invites the new sector to join the Active Set for the call. For example, the BSC can send this message (e.g., via the IP-RAN) to the new BTS using the messaging format 600a shown in FIG. 6A.

For this example embodiment, the active set addition request message 600a includes a 5-byte timestamp field 602a, which identifies the point in time that the message is sent. Also, active set addition request message 600a includes a 5-byte call key field 604a, which identifies the specific call involved. Message 600a also includes an 8-bit protocol identifier field 606a (e.g., type of protocol function involved), message identifier field 608a (e.g., type of message involved), and synchronization code field 610a (e.g., enables a sending BSC, BTS and/or MS to correlate the request and response messages sent and received). For this example embodiment, the protocol identifier field 606a identifies the protocol type as a call processing protocol, and the message identifier field 608a identifies the message type as an active set addition request.

For this example embodiment, in response to receiving an active set addition request message from a BSC, if the new BTS is capable of supporting the request, the new BTS can send an active set addition response message to the BSC, which indicates whether the new BTS has accepted or rejected the request. For example, the new BTS can send this response message (e.g., via the IP-RAN) to the BSC using the messaging format 600b shown in FIG. 6B.

For this example embodiment, the active set addition response message 600b includes a two-byte response code field 602b, which indicates that either a sector is added or the sector addition request is rejected. Message 600b also includes an 8-bit protocol identifier field 604b, message identifier field 606b, and synchronization code field 608b. For this example embodiment, the protocol identifier field 604b identifies the protocol type as a call processing protocol, and the message identifier field 606b identifies the message type as an active set addition response.

In summary, the present invention provides numerous, significant advantages over the prior data transmission techniques. For example, in accordance with the present invention, the FL data can be made available at all of the BTSs directly (or indirectly) under the control of the BSC involved. Consequently, no significant network delay is created when an MS switches to a different serving sector. The bearer paths are created and data is forwarded to the new BTSs, as soon as their respective sectors are added to the Active Set. Thus, cell switching can be accomplished using the lower level PHY and MAC layer signaling from the MS.

Additionally, in accordance with the present invention, data will not be lost when the serving sector is switched. Using the prior techniques, only the serving sector received FL packets. Thus, when an MS requested a new serving sector, the data continued to flow to the old serving sector until the new bearer paths could be activated. That data was lost while the MS began monitoring the new serving sector. In contrast to the prior techniques, the present invention provides a technique that allows an MS to begin receiving the correct data from the moment the MS switches serving sectors. Consequently, no data (e.g., packets) is lost because all of the BTSs involved can receive the same data, along with time synchronization information that allows the BTSs to determine just when to transmit the data to the MS involved.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for synchronizing data transmissions in a wireless communications network, comprising the steps of:
   receiving forward link data at a central access unit in the wireless communications network;
   forwarding the forward link data from the central access unit to a plurality of transceivers in the wireless communications network in a single transmission, wherein the forward link data is temporarily stored at each transceiver of the plurality of transceivers, and a first transceiver of the plurality of transceivers forwards the temporarily stored forward link data to a mobile station;
   transmitting a transceiver addition request message from the central access unit to a second transceiver, the second transceiver being a transceiver different from the plurality of transceivers; and
   responsive to the transceiver addition request message, including the second transceiver in the plurality of transceivers;
   forwarding the forward link data from the central access unit to the second transceiver in the plurality of transceivers;
   wherein the mobile station transmits a transceiver selection message on a reverse link to the second transceiver in the plurality of transceivers, and selects the second transceiver in the plurality of transceivers for forwarding the temporarily stored forward link data.

2. The method of claim 1, wherein the mobile station selects the first transceiver of the plurality of transceivers for forwarding the temporarily stored forward link data.

3. The method of claim 1, wherein the wireless communications network comprises an Internet Protocol-based radio access network, the central access unit comprises a base station controller, and the plurality of transceivers comprises a plurality of base transceiver stations.

4. The method of claim 1, wherein the central access unit comprises a base transceiver station.

5. The method of claim 1, wherein the forward link data comprises a GRE packet.

6. The method of claim 1, wherein the forward link data comprises VoIP call data.

7. The method of claim 1, wherein:
   the forward link data comprises a GRE packet; and
   the GRE packet includes data for synchronizing the plurality of transceivers.

8. The method of claim 1, wherein the mobile station performs fast cell selection, and selects the first transceiver of the plurality of transceivers for forwarding the temporarily stored forward link data.

9. The method of claim 1, wherein the mobile station transmits said transceiver selection message on a reverse link to the first transceiver, wherein the reverse link is an air interface signaling link.

10. A method for synchronizing data transmissions in an Internet Protocol-based radio access network, comprising the steps of:
    receiving data on a forward link at a base station controller; and
    transmitting the data from the base station controller on a forward link to a plurality of base transceiver stations in a single transmission, wherein each base transceiver station of the plurality of base transceiver stations buffers the data, and a first base transceiver station of the plurality of base transceiver stations transmits the data on a forward link to a mobile station;

transmitting a base transceiver station addition request message from the base station controller to a second base transceiver station, the second base transceiver station being a transceiver different from the plurality of base transceiver stations; and responsive to the base transceiver station addition request message, including the second base transceiver station in the plurality of base transceiver stations;

wherein the base station controller transmits the data on a forward link to the second base transceiver station in the plurality of base transceiver stations; and wherein the mobile station transmits a base transceiver station selection message on a reverse link to the second base transceiver station in the plurality of base transceiver stations, and selects the second base transceiver station in the plurality of base transceiver stations to transmit the data on the forward link to the mobile station.

11. The method of claim 10, wherein the mobile station performs fast cell selection, and selects the first base transceiver station to transmit the data on the forward link to the mobile station.

12. The method of claim 10, wherein:
the data on the forward link comprises a GRE packet; and
the GRE packet includes data for synchronizing the plurality of base transceiver stations.

13. A system for synchronizing data transmissions in a wireless communications network, comprising:
a central access unit configured-to to:
transmit forward link data to a plurality of transceivers in a single transmission, wherein a first transceiver of the plurality of transceivers is configured to transmit the forward link data to a mobile station;
transmit a transceiver addition request message to a second transceiver, the second transceiver being a transceiver different from the plurality of transceivers; and
responsive to the transceiver addition request message, include the second transceiver in the plurality of transceivers;
forwarding the forward link data from the central access unit to the second transceiver in the plurality of transceivers;
wherein the mobile station transmits a transceiver selection message on a reverse link to the second transceiver in the plurality of transceivers, and selects the second transceiver in the plurality of transceivers for forwarding the temporarily stored forward link data.

14. The system of claim 13, wherein the wireless communications system comprises an Internet Protocol-based radio access network.

15. The system of claim 13, wherein the plurality of transceivers comprises a plurality of base transceiver stations.

16. The system of claim 13, wherein the plurality of transceivers comprises a plurality of base stations.

17. The system of claim 13, wherein the central access unit comprises a base station controller.

18. A method for synchronizing data transmissions in a wireless communications network, comprising the steps of:
receiving forward link data at a central access unit in the wireless communications network; and
forwarding the forward link data from the central access unit to a plurality of transceivers in the wireless communications network in a single transmission, wherein the forward link data is temporarily stored at each transceiver of the plurality of transceivers, and a first transceiver of the plurality of transceivers forwards the temporarily stored forward link data to a mobile station;
transmitting a transceiver addition request message from the central access unit to a second transceiver, the second transceiver being a transceiver different from the plurality of transceivers;
responsive to the transceiver addition request message, including the second transceiver in the plurality of transceivers; and
forwarding the forward link data from the central access unit to the second transceiver in the plurality of transceivers;
wherein the mobile station selects the second transceiver in the plurality of transceivers for forwarding the temporarily stored forward link data; and
wherein the second transceiver in the plurality of transceivers forwards the forward link data to the mobile station.

19. The method of claim 18, wherein the wireless communications network comprises an Internet Protocol-based radio access network, the central access unit comprises a base station controller, and the plurality of transceivers comprises a plurality of base transceiver stations.

20. The method of claim 18, wherein the central access unit comprises a base transceiver station.

* * * * *